United States Patent
Zeng et al.

(10) Patent No.: US 10,191,581 B2
(45) Date of Patent: Jan. 29, 2019

(54) FOLDING DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Yang Zeng, Shanghai (CN); Xingyao Zhou, Shanghai (CN); Lihua Wang, Shanghai (CN); Qijun Yao, Shanghai (CN); Xiaoguang Zhu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 59 days.

(21) Appl. No.: 15/214,952

(22) Filed: Jul. 20, 2016

(65) Prior Publication Data
US 2017/0285837 A1   Oct. 5, 2017

(30) Foreign Application Priority Data
Mar. 29, 2016  (CN) .......................... 2016 1 0187858

(51) Int. Cl.
*G06F 1/16* (2006.01)
*G06F 3/041* (2006.01)
*G06F 3/044* (2006.01)

(52) U.S. Cl.
CPC .......... *G06F 3/0416* (2013.01); *G06F 1/1641* (2013.01); *G06F 1/1677* (2013.01); *G06F 3/044* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 2007/0256502 | A1* | 11/2007 | Aebersold | G01L 1/148 73/794 |
| 2011/0122107 | A1* | 5/2011 | Onkura | G06F 1/1616 345/207 |
| 2014/0202014 | A1* | 7/2014 | Choi | G01B 21/22 33/303 |
| 2015/0116608 | A1* | 4/2015 | Jeong | G06F 1/1652 349/12 |

(Continued)

FOREIGN PATENT DOCUMENTS

CN          104731436 A        6/2015

*Primary Examiner* — Ifedayo B Iluyomade
(74) *Attorney, Agent, or Firm* — Kilpatrick Townsend & Stockton LLP

(57) ABSTRACT

Disclosed is a folding display device comprising: a display panel. and a folding shaft. The display play can be configured to be folded along the display device. The folding shaft can be configured to partition the display panel into a first display portion and a second display portion, and a folding state detecting electrode is a capacitive detecting electrode and is provided on the first display portion and/or the second display portion. According to the disclosure, the problem of the prior art that a detecting unit in a folding display device is difficult to determine the specific degree of folding of the folding display device may be solved. Thereby, the degree of folding of a folding display device can be accurately detected.

20 Claims, 22 Drawing Sheets

(56) References Cited

U.S. PATENT DOCUMENTS

| | | | |
|---|---|---|---|
| 2015/0169091 A1* | 6/2015 | Ho | G06F 3/0416 345/173 |
| 2015/0187325 A1* | 7/2015 | Yeo | H04N 5/4403 345/156 |

* cited by examiner

FOLDING DISPLAY DEVICE

CROSS-REFERENCE TO RELATED APPLICATION

This application claims the benefit of CN Application No. 201610187858.2 filed on Mar. 29, 2016, titled "FOLDING DISPLAY DEVICE", which is incorporated herein by reference in its entirety.

TECHNICAL FIELD

The present disclosure relates to the field of display technologies, and in particular, to a folding display device.

TECHNICAL BACKGROUND

With the continuous development of display technologies, portable display devices such as mobile phone and tablet computer, etc., appear everywhere in people's daily life. The visual experience of a user can be improved by enlarging the display screen of a display device; however, the enlarging of the display screen will make the display device inconvenient to carry. As a result, a folding display device emerges as the times require.

In the prior art, a folding display device, which is consisted of a folding shaft and liquid crystal display panels located on the two sides of the folding shaft, may also be folded around the folding shaft. When it requires to adjust the display status and the touch function of the display panel of the folding display device according to the open or closed state of the folding display device, it needs to detect the open or closed state of the above folding display device.

As shown in FIG. 1A and FIG. 1B, in the prior art, a separate detecting unit 110 is generally set to monitor the open or closed state of a folding display device. For example, a detecting unit 110 with a mechanical structure or an electromagnetical structure is set at the outer edge of the two sides of the folding display device that is far from the folding shaft 120 in order to detect the open or closed state. Generally, such a detecting unit 110 can only detect the two states of the folding display device, i.e., "open" state (see FIG. 1A) and "closed" state (see FIG. 1B), and it is difficult to determine the specific degree of folding of the folding display device.

SUMMARY OF THE DISCLOSURE

The present disclosure provides a folding display device, thereby accurately detecting the degree of folding of the folding display device.

One embodiment provides a folding display device, which includes:

a display panel;

a folding shaft along which the display device is capable to be folded;

wherein, the folding shaft partitions the display panel into a first display portion and a second display portion; and a folding state detecting electrode is provided on the first display portion and/or the second display portion and is a capacitive detecting electrode.

The disclosure provides a folding display device, wherein the folding display device includes: a display panel; a folding shaft along which the display device can be folded; the folding shaft partitions the display panel into a first display portion and a second display portion; a folding state detecting electrode is provided on the above first display portion and/or second display portion and is a capacitive detecting electrode, so that the specific degree of folding of the folding device can be calculated based on the structure of above capacitive detecting electrode. Thereby, the problem of the prior art that a detecting unit in a folding display device cannot determine the specific degree of folding of the folding display device can be solved.

DETAILED DESCRIPTION OF THE PREFERRED EMBODIMENT

Figure 1A:
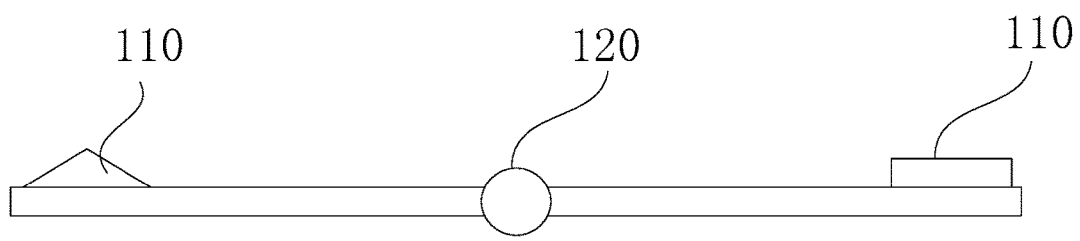
FIG. 1A and FIG. 1B are structural representations of a folding display device in the prior art.
Figure 1B:
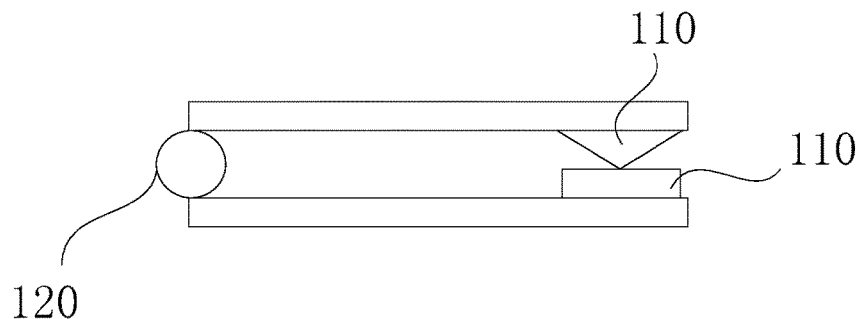

The disclosure will be further illustrated in detail below in conjunction with the drawings and embodiments. It should be understood that the specific embodiments described here are only used for explaining the disclosure, rather than limiting the disclosure. Additionally, it should be further noted that for easy description, only a part of the structure related to the disclosure, rather than the whole structure, is shown in the drawings.

FIG. 2A-FIG. 2D are structural representations of a folding display device according to the disclosure; FIG. 3A-FIG. 3D are structural representations of another folding display device according to one embodiment. As shown in each of the above schematic diagrams, a folding display device according to one embodiment specifically includes a display panel 21 and a folding shaft 22.

The display device can be folded along the folding shaft 22. The folding shaft 22 partitions the display panel 21 into a first display portion 211 and a second display portion 212. The first display portion 211 and/or the second display portion 212 are/is provided with a folding state detecting electrode 23, which is a capacitive detecting electrode.

According to the technical solutions of the embodiment, by using the capacitive detecting electrode, the specific degree of folding of the first display portion 211 and the second display portion 212 can be detected, thereby solving the problem of the prior art that the specific degree of folding of the folding display device cannot be determined. Additionally, in the embodiment, the first display portion and the second display portion may be display panels that display the same picture, for example, a flexible organic light-emitting diode display panel, or may be display panels that display different pictures, for example, liquid crystal display panels.

Specifically, the capacitive detecting electrode according to the embodiment may be realized in two modes, i.e., first implementation mode: a mutual-capacitive detecting electrode; and second implementation mode: a self-capacitive detecting electrode.

Figure 2A:
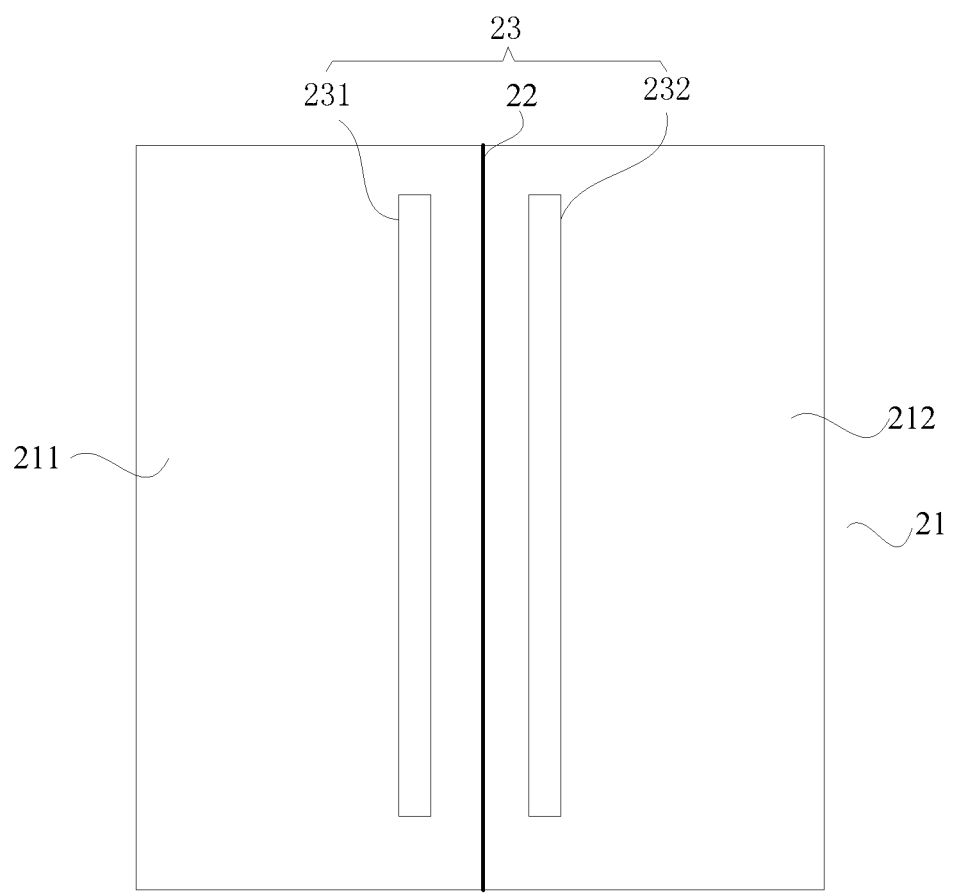
FIG. 2A is a structural representation of a folding display device according to one embodiment.

Exemplarily, for the first implementation mode of the capacitive detecting electrode, FIG. 2A shows a structural representation 1 of a folding display device according to one embodiment. As shown in FIG. 2A, in the display device of the present embodiment, the folding state detecting electrode 23 may include a first folding state detecting electrode 231 and a second folding state detecting electrode 232. The first folding state detecting electrode 231 is provided on a side of the first display portion 211 that is adjacent to the folding shaft 22, the second folding state detecting electrode 232 is provided on a side of the second display portion 212 that is adjacent to the folding shaft 22, and the first folding state detecting electrode 231 and the second folding state detecting electrode 232 are mutual-capacitive detecting electrodes. The first folding state detecting electrode 231 and the second folding state detecting electrode 232 are provided to be adjacent to the folding shaft 22 so that the capacitance therebetween may be increased, and the design region occupied by the above two folding state detecting electrodes can be decreased effectively, thereby decreasing the impaction on the display. Exemplarily, the distance from the first folding state detecting electrode 231 and the second folding state detecting electrode 232 to the folding shaft 22 may be in a range of 0.01 mm to 10 mm, preferably, in a range of 0.05 mm to 1 mm.

In one embodiment, the first folding state detecting electrode 231 may be selected as the driving electrode, and the second folding state detecting electrode 232 is a receiver electrode; or alternatively, the second folding state detecting electrode 232 is selected as a driving electrode, and the first folding state detecting electrode 231 is a receiver electrode. A driving signal may be sent to the driving electrode and the corresponding detection signal may be obtained from the receiver electrode. Because the degree of folding of the folding display device is directly related to the distance between the first folding state detecting electrode 231 and the second folding state detecting electrode 232, and such distance may influence the capacitance value therebetween and the intensity of the obtained detection signal, the distance may be determined according to the intensity of the detection signal, that is, the degree of folding of the folding display device may be determined, for example, the stronger the detection signal is, the smaller the distance therebetween will be, and the higher the degree of folding will be.

In some embodiments, as shown in FIG. 2A, the first folding state detecting electrode 231 and the second folding state detecting electrode 232 are provided symmetrically about the folding shaft 22, so that when folded, the position of the first folding state detecting electrode 231 coincides with the position of the second folding state detecting electrode 232 with respect to relative positions, the capacitance therebetween is large, and the change of the degree of folding has a large affection on the change of the capacitance value therebetween, that is, it also has a large affection on the change of the intensity of the detection signal, thereby enabling a more accurate detection result of the degree of folding of the folding display device.

For the shapes of the first folding state detecting electrode 231 and the second folding state detecting electrode 232 in the embodiment, specifically, as shown in FIG. 2A, they are both strip electrodes, and the extension direction of the strip electrode is the same as that of the folding shaft 22. In such configuration, the edge region of the first display portion 211 and the second display portion 212 may be fully utilized, and in the case of the certain area occupied by the first folding state detecting electrode 231 and the second folding state detecting electrode 232, the occupation on the display region of the first display portion 211 and the second display portion 212 may be reduced, thereby improving visual experience of a user. Alternatively, one of the first folding state detecting electrode 231 and the second folding state detecting electrode 232 may be a strip electrode, and the other may be other shapes, such as a shape of a curviform, a circle, a triangle or other shapes, or it may be determined according to the shape of the folding display device, which will not be specifically limited here.

Figure 2B:
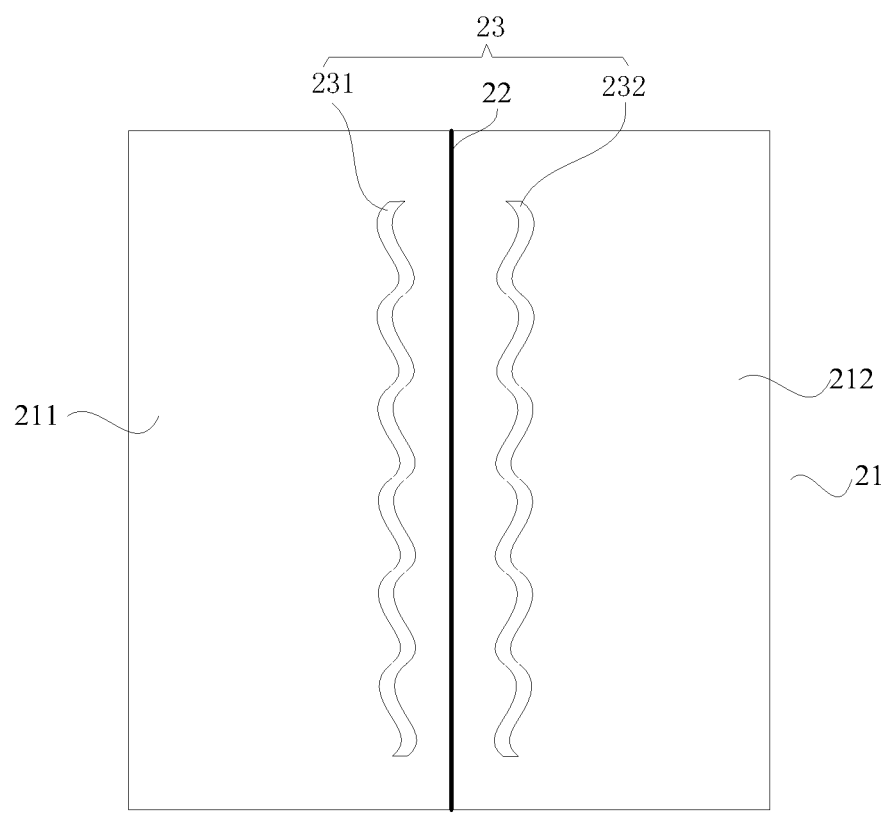
FIG. 2B is a structural representation of a folding display device according to one embodiment.

FIG. 2B is a structural representation of a folding display device according to one embodiment. The first folding state detecting electrode 231 and the second folding state detecting electrode 232 may also be, as shown in FIG. 2B, both curviform electrodes. Alternatively, one of the first folding state detecting electrode 231 and the second folding state detecting electrode 232 may be a curviform electrode, and the other may be other shapes, such as a shape of a strip, a circle, a triangle or other shapes, or it may be determined according to the shape of the folding display device, which will not be specifically limited here.

Figure 2C:
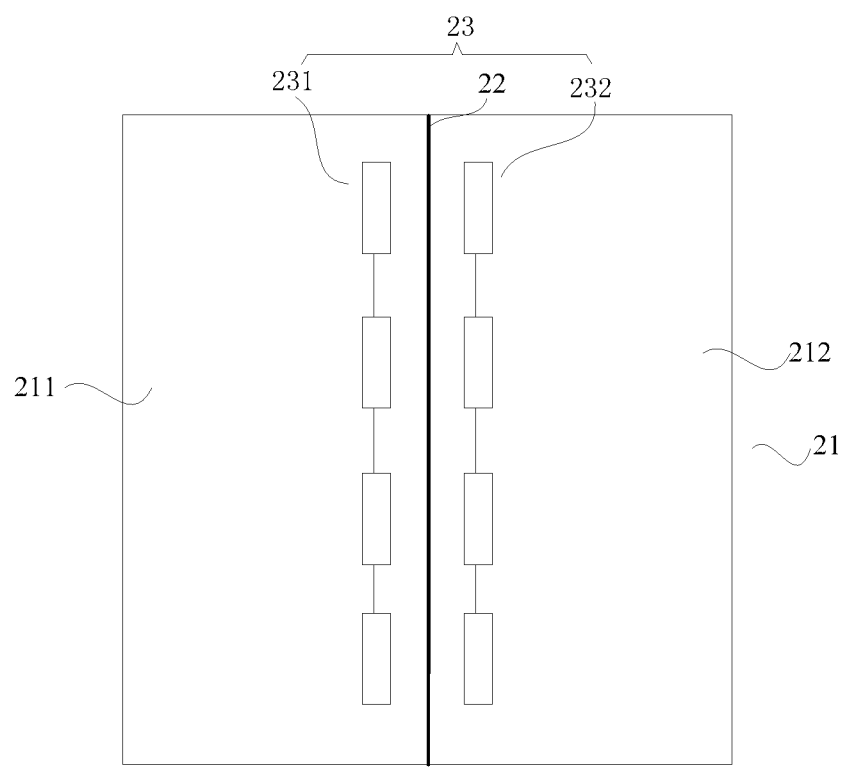
FIG. 2C is a structural representation of a folding display device according to one embodiment.

Different from the continuous setting of the first folding state detecting electrode 231 and the second folding state detecting electrode 232 in FIG. 2A and FIG. 2B, in one embodiment, the first folding state detecting electrode 231 and/or the second folding state detecting electrode 232 may also be set discontinuously. For example, FIG. 2C is a structural representation of a folding display device according to one embodiment, as shown in FIG. 2C, the first folding state detecting electrode 231 and the second folding state detecting electrode 232 each may also include a plurality of electrode detecting units that are electrically connected, or alternatively, only one of the first folding state detecting electrode 231 and the second folding state detecting electrode 232 includes a plurality of electrode detecting units that are electrically connected; specifically, the electrode detecting unit may have any one of a rectangle, a curviform, a diamond, a triangle or a circle. FIG. 2C only shows an example in which the electrode detecting unit has a shape of a rectangle. In the present embodiment, by employing a discontinuous setting mode, the affection of the folding state detecting electrode on the display can be further decreased.

Figure 2D:
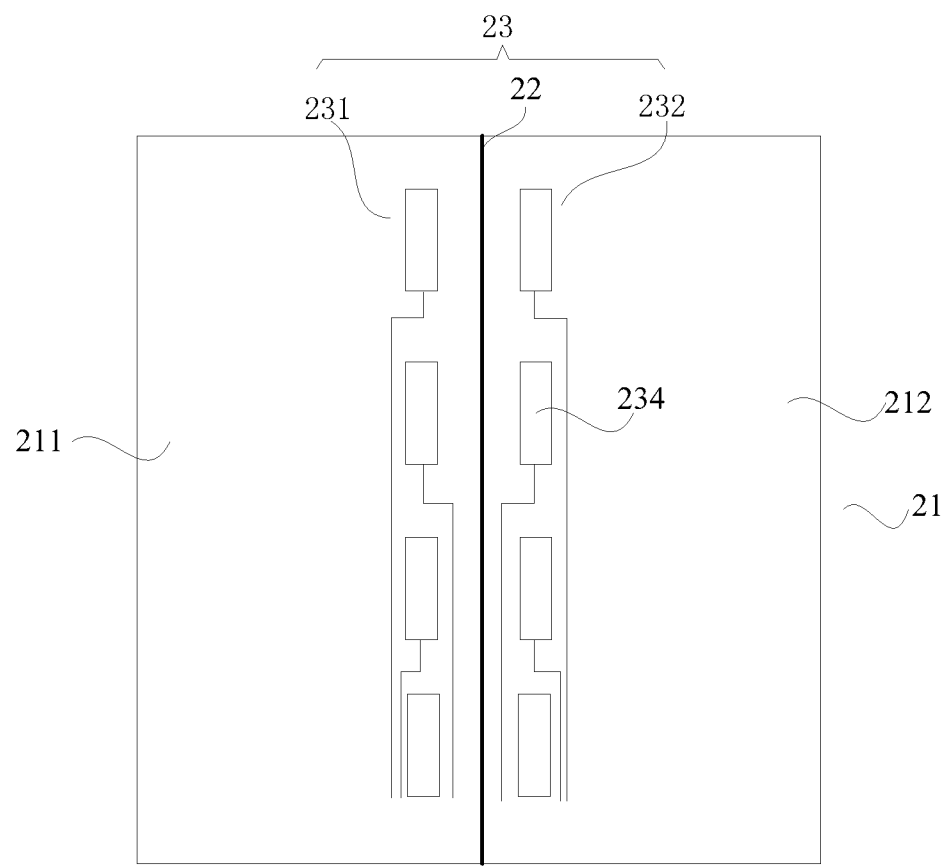
FIG. 2D is a structural representation of a folding display device according to one embodiment.

FIG. 2D is a structural representation of a folding display device according to one embodiment. As shown in FIG. 2D, in the present embodiment, the first folding state detecting electrode 231 and the second folding state detecting electrode 232 each include a plurality of first folding state detecting subelectrodes 234. The plurality of first folding state detecting subelectrodes 234 are independent from each other, rather than being electrically connected, so that the folding state of the folding display device may be detected by employing a plurality of first folding state detecting subelectrodes 234, thereby increasing the reliability of detection. Especially for the case that the folding display device includes a number of partial region folding, statuses of the partial region folding may be detected by employing the configuration according to the technical solution of the present embodiment. Additionally, it is also possible that only one of the first folding state detecting electrode 231 and the second folding state detecting electrode 232 includes a plurality of first folding state detecting subelectrodes 234.

Figure 2E:
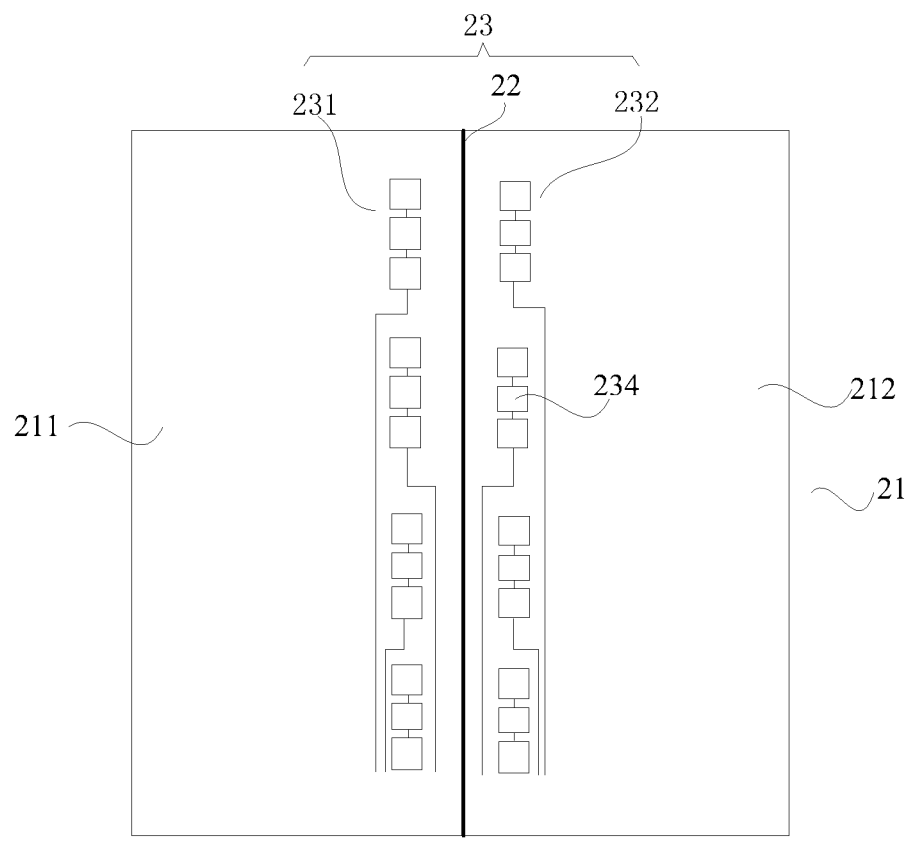
FIG. 2E is a structural representation of a folding display device according to one embodiment.

Additionally, FIG. 2E is a structural representation of a folding display device according to one embodiment, and a plurality of first folding state detecting subelectrodes 234 therein may also employ a discontinuous setting mode. That is, each first folding state detecting subelectrode 234 includes a plurality of electrode detecting subunits that are electrically connected. By employing the discontinuous setting mode, the affection of the folding state detecting electrode on the display can be further decreased.

Figure 3A:
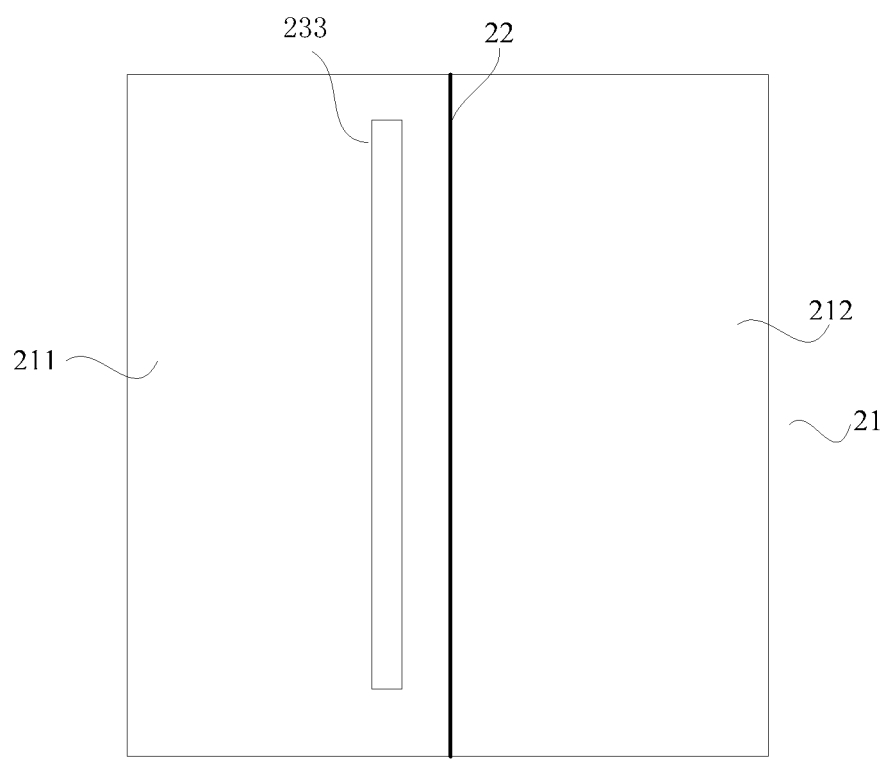
FIG. 3A is a structural representation of another folding display device according to one embodiment.

Exemplarily, for the second implementation mode of the capacitive detecting electrode, FIG. 3A is a structural representation of another folding display device according to one embodiment. As shown in FIG. 3A, the first display portion 211 is provided with a third folding state detecting electrode 233. Additionally, the third folding state detecting electrode 233 may be set on the second display portion 212, or the third folding state detecting electrode 233 may be set on both the first display portion 211 and the second display portion 212. The third folding state detecting electrode 233 is a self-capacitive detecting electrode.

Specifically, for the third folding state detecting electrode 233 on the first display portion 211, a mutual capacitance exists between the third folding state detecting electrode 233 and the conductive elements on the first display portion 211 and the second display portion 212. For example, a mutual capacitance exists between the third folding state detecting electrode 233 and all the conductive elements such as metal wires and display electrode, etc., on the first display portion 211 and the second display portion 212. Thus, when the degree of folding of the folding display device changes, it causes a change in the mutual capacitance between the third folding state detecting electrode 233 and the conductive elements on the second display portion 212, and a driving signal may be sent to the third folding state detecting electrode 233 during operation, and thus the degree of folding of the folding display device may be calculated according to the detection signal obtained from the third folding state detecting electrode 233, that is, the degree of folding of the folding display device may be obtained according to the detection signal obtained from the third folding state detecting electrode 233.

The third folding state detecting electrode 233 according to the embodiment may have various shapes. For example, as shown in FIG. 3A, the third folding state detecting electrode 233 may be a strip electrode of which the extension direction may be the same as that of the folding shaft 22.

Figure 3B:
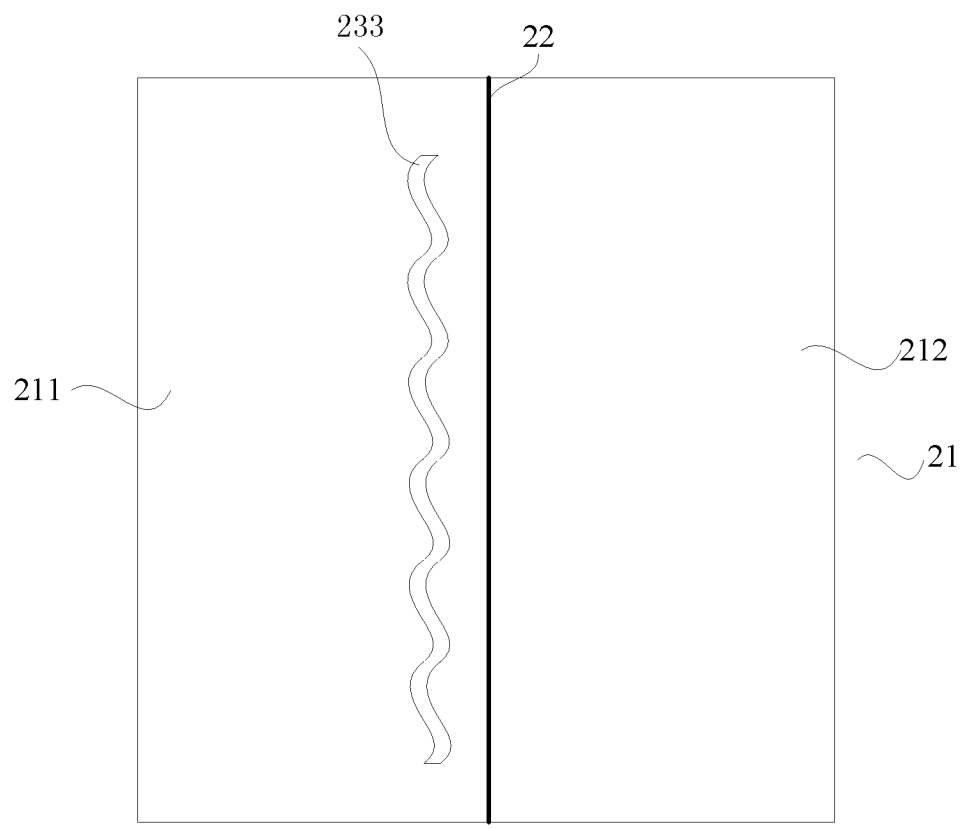
FIG. 3B is a structural representation of another folding display device according to one embodiment.

Alternatively, FIG. 3B is a structural representation of another folding display device according to one embodiment. As shown in FIG. 3B, the third folding state detecting electrode 233 may be a curviform electrode.

Figure 3C:
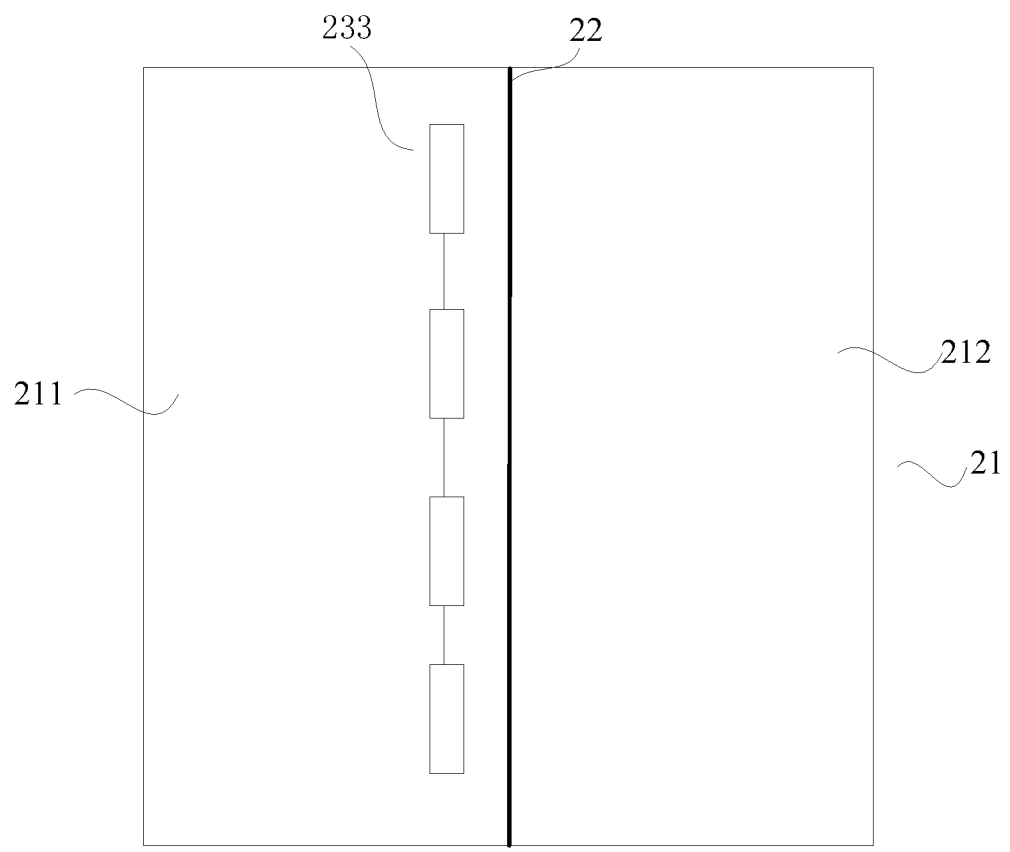
FIG. 3C is a structural representation of another folding display device according to one embodiment.

Alternatively, as is different from the continuous setting of the third folding state detecting electrode 233 in FIG. 3A and FIG. 3B, in one embodiment, the third folding state detecting electrode 233 may also be set discontinuously. For example, FIG. 3C is a structural representation of another folding display device according to one embodiment, as shown in FIG. 3C, the third folding state detecting electrode 233 includes a plurality of electrode detecting units that are electrically connected. Specifically, the electrode detecting unit may have a shape of any one of a rectangle, a curviform, a diamond, a triangle or a circle. FIG. 3C only shows an example in which the electrode detecting unit has a shape of a rectangle. In the present embodiment, a discontinuous setting mode is employed, and the affection of the folding state detecting electrode on the display can be further decreased.

Figure 3D:
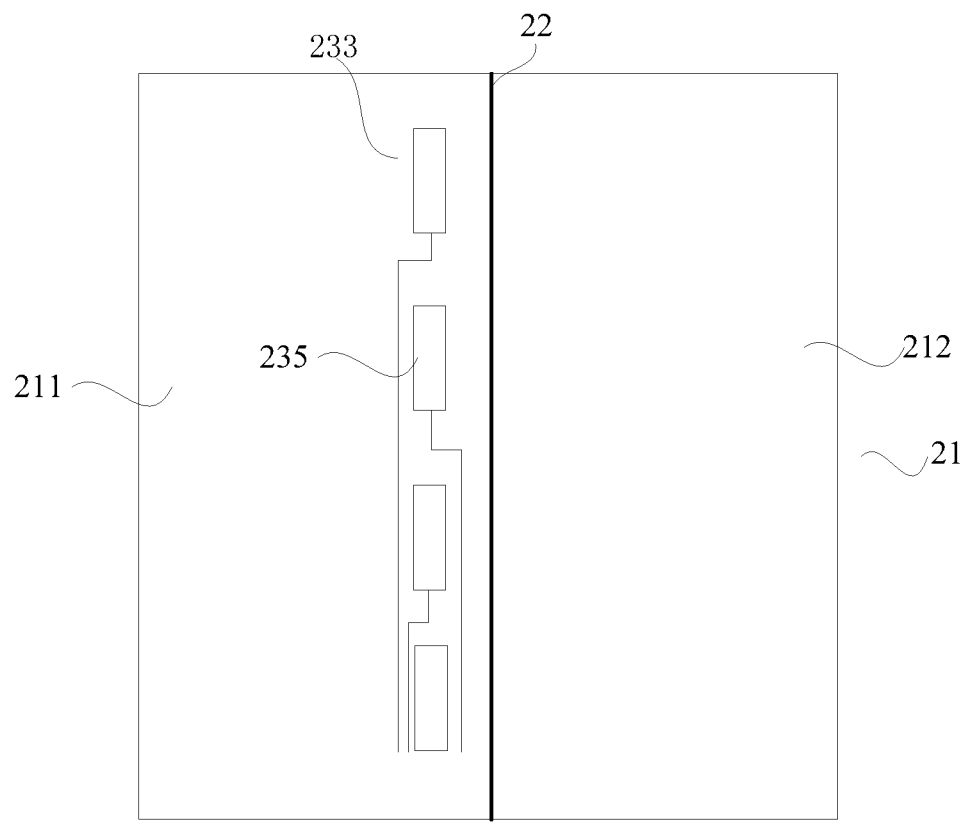
FIG. 3D is a structural representation of another folding display device according to one embodiment.

FIG. 3D is a structural representation of another folding display device according to one embodiment. As shown in FIG. 3D, the third folding state detecting electrode 233 may also include a plurality of second folding state detecting subelectrodes 235, wherein the plurality of second folding state detecting subelectrodes 235 are not electrically connected, so that the folding state can be detected as long as one of the second folding state detecting subelectrodes 235 can operate normally even if others of the second folding state detecting subelectrodes 235 is unable to operate, thereby increasing the reliability of detection. Especially, for the case that the folding display device includes partial region folding, the partial region folding status can be detected by employing the technical solution of the present embodiment.

Figure 3E:
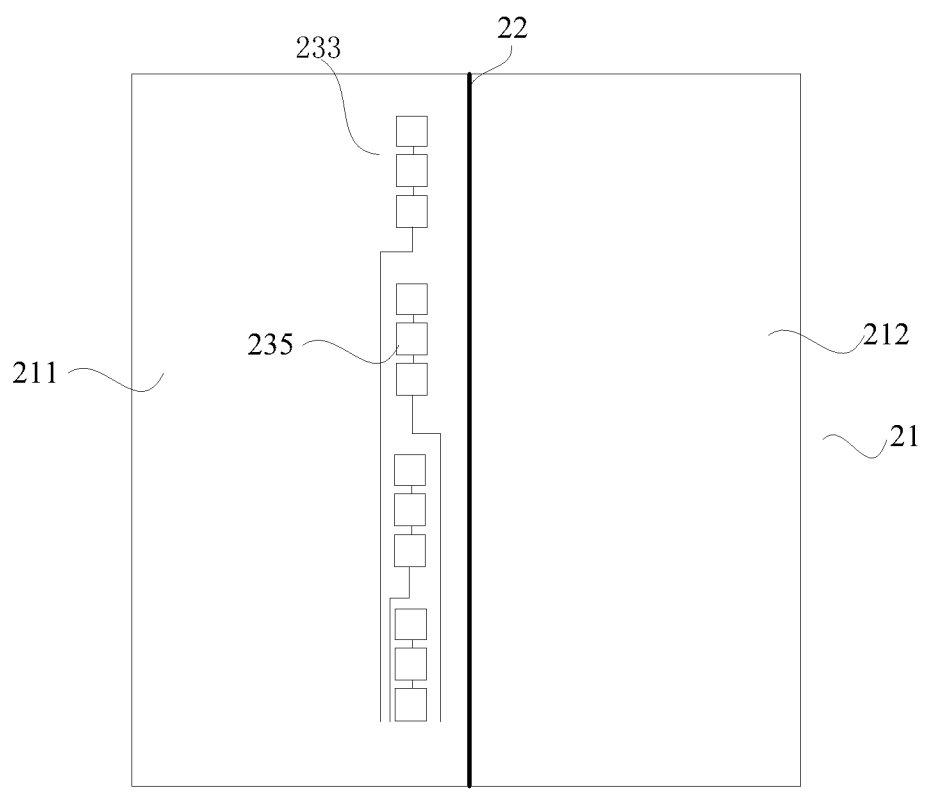
FIG. 3E is a structural representation of another folding display device according to one embodiment.

Additionally, FIG. 3E is a structural representation of another folding display device according to one embodiment, wherein the plurality of second folding state detecting subelectrodes 235 may also employ a discontinuous setting mode, that is, each second folding state detecting subelectrode 235 includes a plurality of electrode detecting subunits that are electrically connected. By employing the discontinuous setting mode, the affection of the second folding state detecting subelectrode 235 on the display can be further decreased.

On the basis of the above embodiments, in the folding display device according to one embodiment, a plurality of touch electrodes may also be provided on the display panel, and the touch electrodes may be provided on the same layer as the folding state detecting electrode. The touch electrodes can detect a touch operation of a user on the display panel. In the technical solution of the disclosure, the touch electrode and the folding state detecting electrode may be provided respectively for implementing the corresponding functions, thus effectively avoiding the mutual influence therebetween.

Figure 4A:
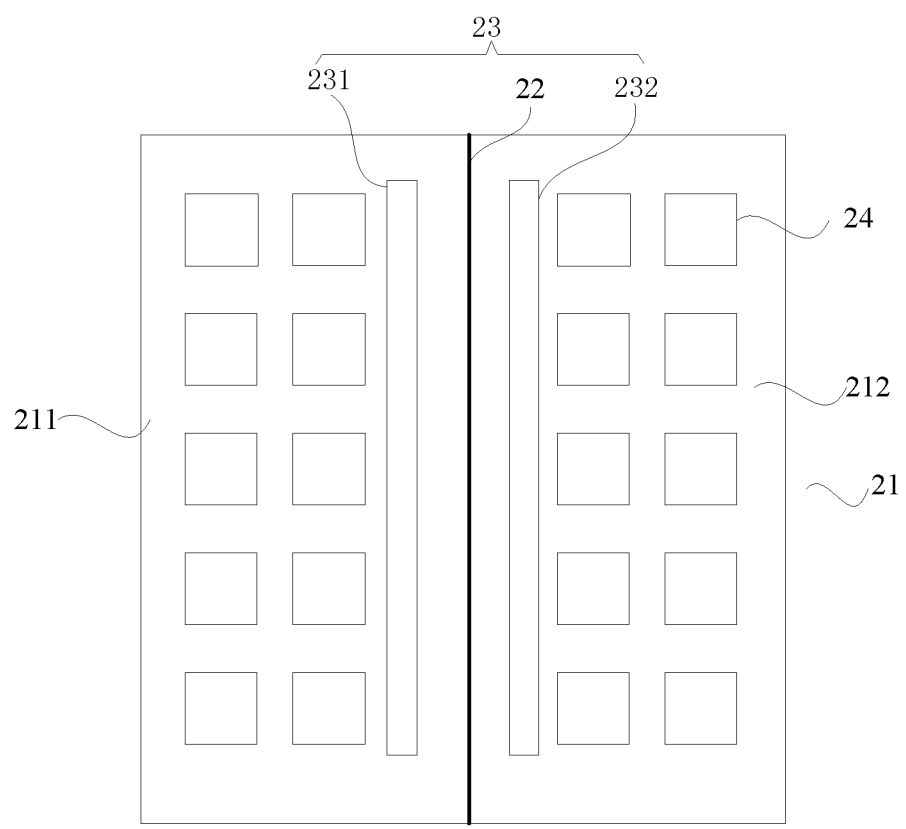
FIG. 4A is a structural representation of yet another folding display device according to one embodiment.

FIG. 4A is a structural representation of yet another folding display device according to one embodiment. The display panel 21 of the present embodiment is further provided with a plurality of touch electrodes 24, wherein the folding state detecting electrode 23 is provided on the same layer as the touch electrodes 24.

Exemplarily, FIG. 4A shows that the folding shaft 22 partitions the display panel 21 into a first display portion 211 and a second display portion 212. In the present embodiment, the folding state detecting electrode 23 is a mutual-capacitive detecting electrode, that is, the folding state detecting electrode 23 includes a first folding state detecting electrode 231 and a second folding state detecting electrode 232. The first folding state detecting electrode 231 on the first display portion 211 is provided in the same layer as a plurality of touch electrodes 24 of the first display portion 211, and the first folding state detecting electrode 231 on the second display portion 212 is provided in the same layer as a plurality of touch electrodes 24 of the second display portion 212. In such a configuration, the thickness of the folding display device may be decreased and it does not require to make a folding state detecting electrode alone, thus simplifying the production process, and lowering the cost.

Figure 4B:
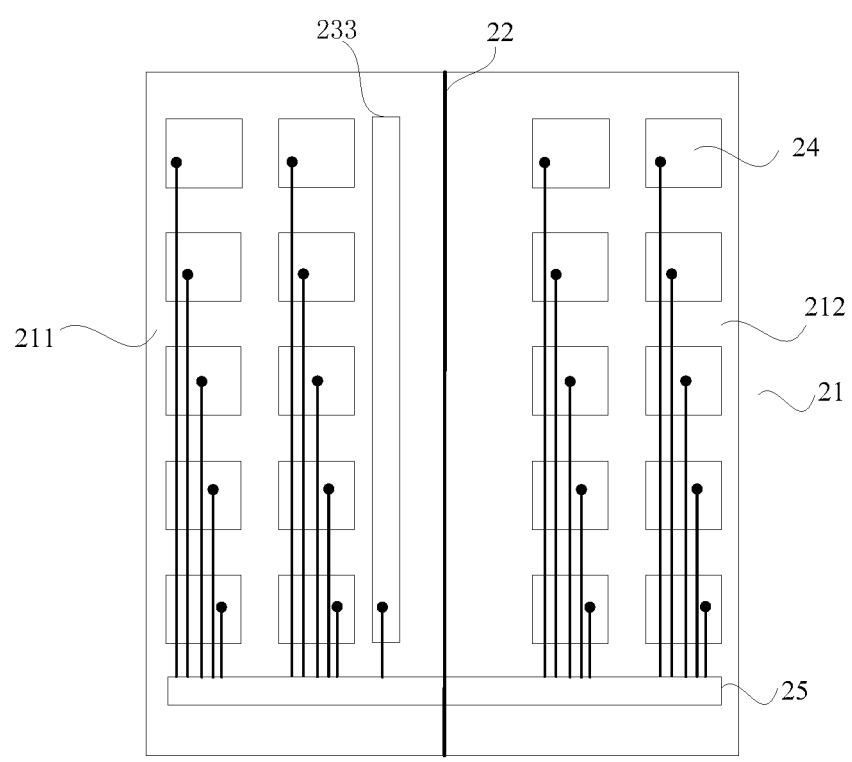
FIG. 4B is a structural representation of yet another folding display device according to one embodiment.

Additionally, FIG. 4B is a structural representation of yet another folding display device according to one embodiment. As shown in FIG. 4B, when the folding state detecting electrode is a self-capacitive detecting electrode, i.e., in the case that a third folding state detecting electrode 233 is provided on the first display portion 211 and/or the second display portion 212, the third folding state detecting electrode 233 is provided in the same layer as the touch electrodes 24 that is located on one and the same display portion. Similarly, in such a configuration, the thickness of the folding display device may be decreased, and it does not require to make a folding state detecting electrode alone, thus simplifying the production process, and lowering the cost.

Figure 4C:
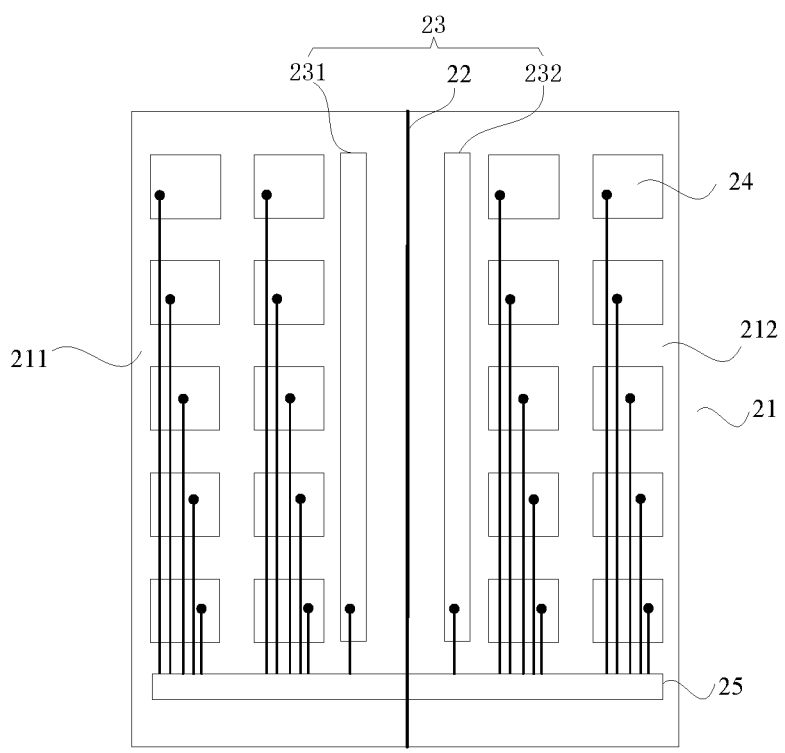
FIG. 4C is a structural representation of yet another folding display device according to one embodiment.

In one embodiment, the display panel 21 may further include a control chip 25, where the plurality of touch electrodes 24 and the folding state detecting electrode 23 are both electrically connected with the control chip 25. By multiplexing the control chip 25 via the plurality of touch electrodes 24 and the folding state detecting electrode 23, one control chip may be omitted, so that the cost may be lowered. Exemplarily, FIG. 4C is a structural representation of yet another folding display device according to one embodiment. As shown in FIG. 4C, when the folding state detecting electrode 23 includes a first folding state detecting electrode 231 and a second folding state detecting electrode 232, the first folding state detecting electrode 231 and the second folding state detecting electrode 232 are electrically connected with the control chip 25 respectively. During working, the control chip sends a driving signal to the driving electrode therein and obtains a detection signal from a receiver electrode, and it may determine the degree of folding of the folding device according to the detection signal.

Figure 4D:
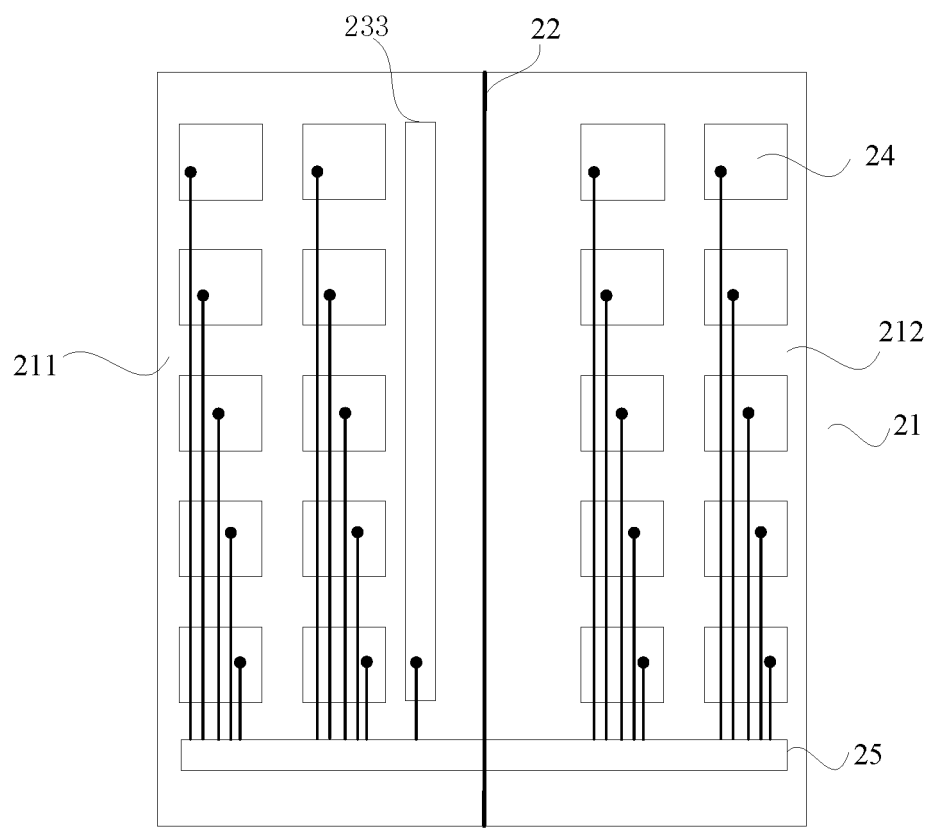
FIG. 4D is a structural representation of yet another folding display device according to one embodiment.

In addition, FIG. 4D is a structural representation of yet another folding display device according to one embodiment. As shown in FIG. 4D, when the folding state detecting electrode 23 is a third folding state detecting electrode 233 provided on the first display portion 211 and/or the second display portion 212, a plurality of touch electrodes 24 and the third folding state detecting electrode 233 are electrically connected with the control chip 25. During working, the control chip 25 sends a driving signal to the third folding state detecting electrode 233 and obtains a detection signal, and it may determine the degree of folding of the folding device according to the detection signal.

Figure 5A:
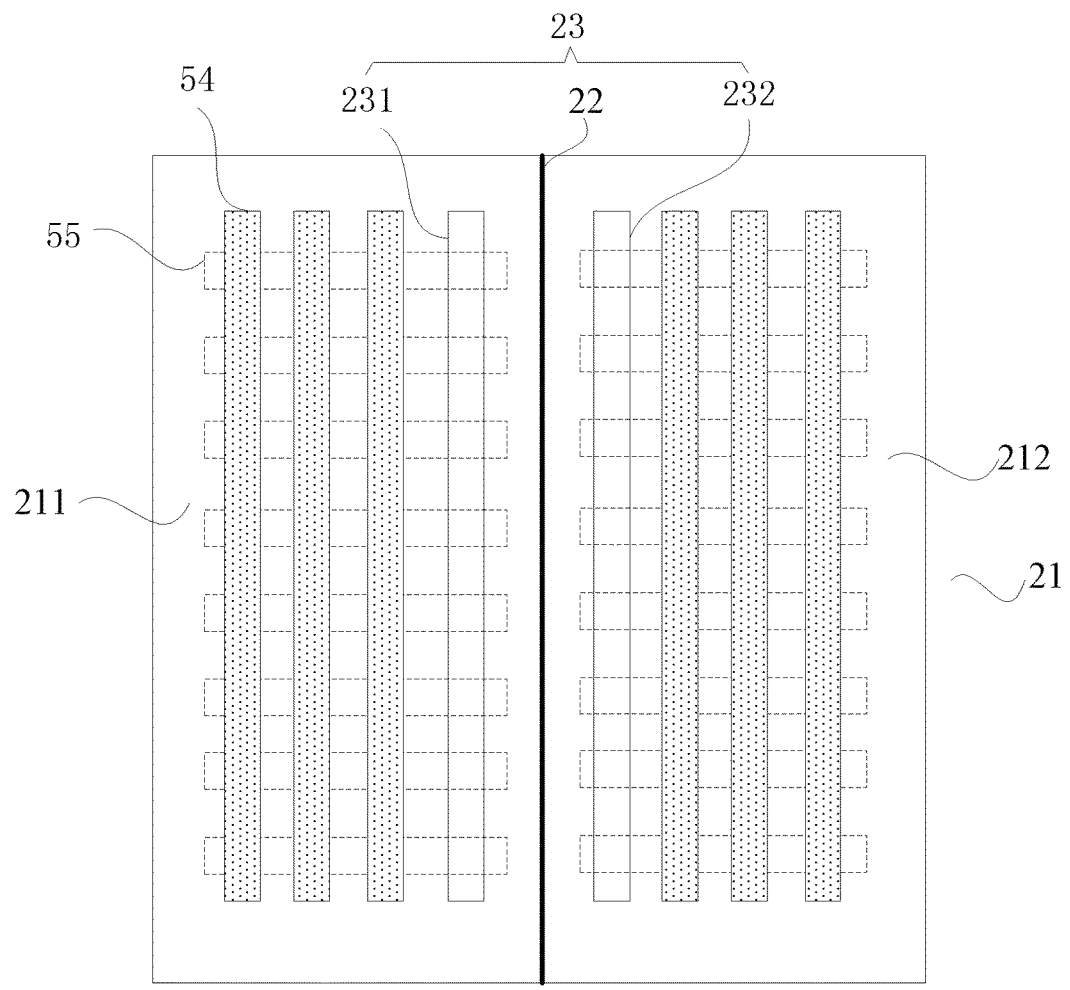
FIG. 5A is a structural representation of a further folding display device according to one embodiment.
Figure 5B:
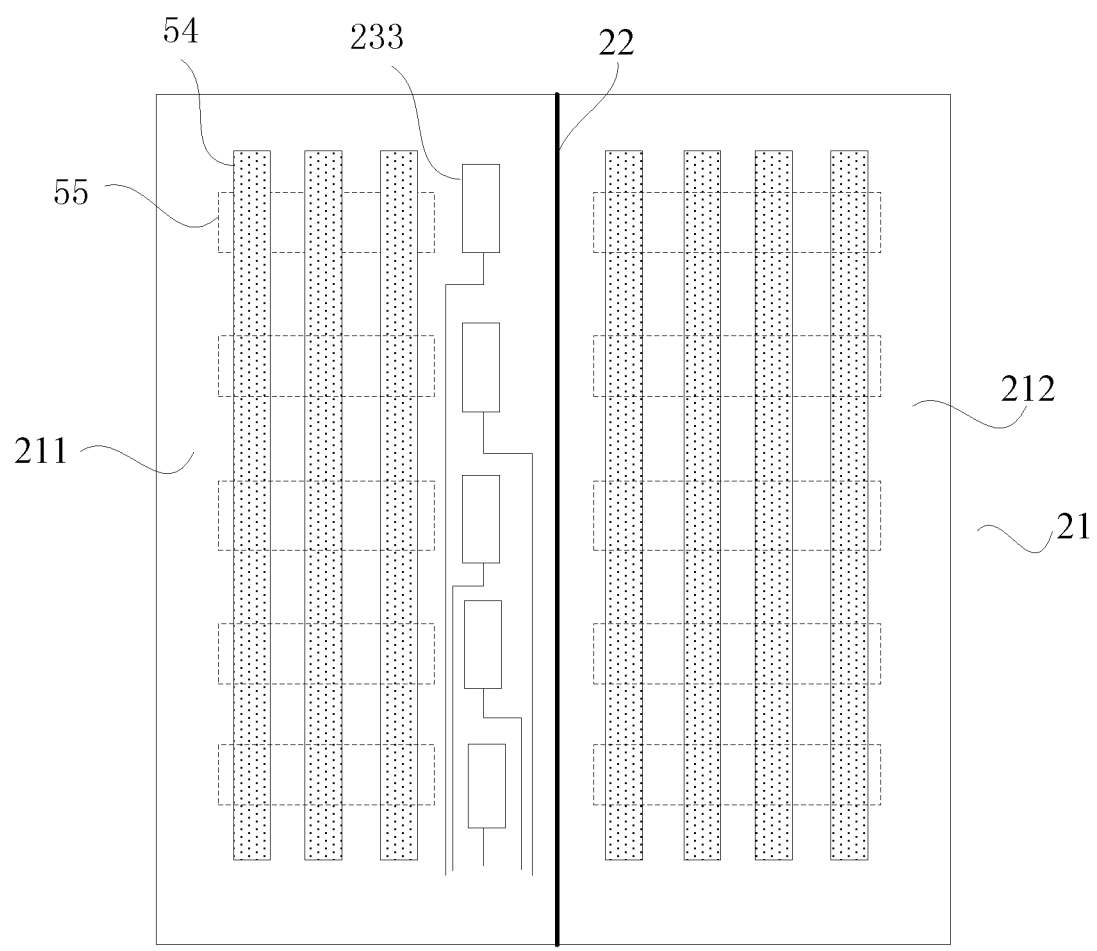
FIG. 5B is a structural representation of a further folding display device according to one embodiment.
Figure 5C:
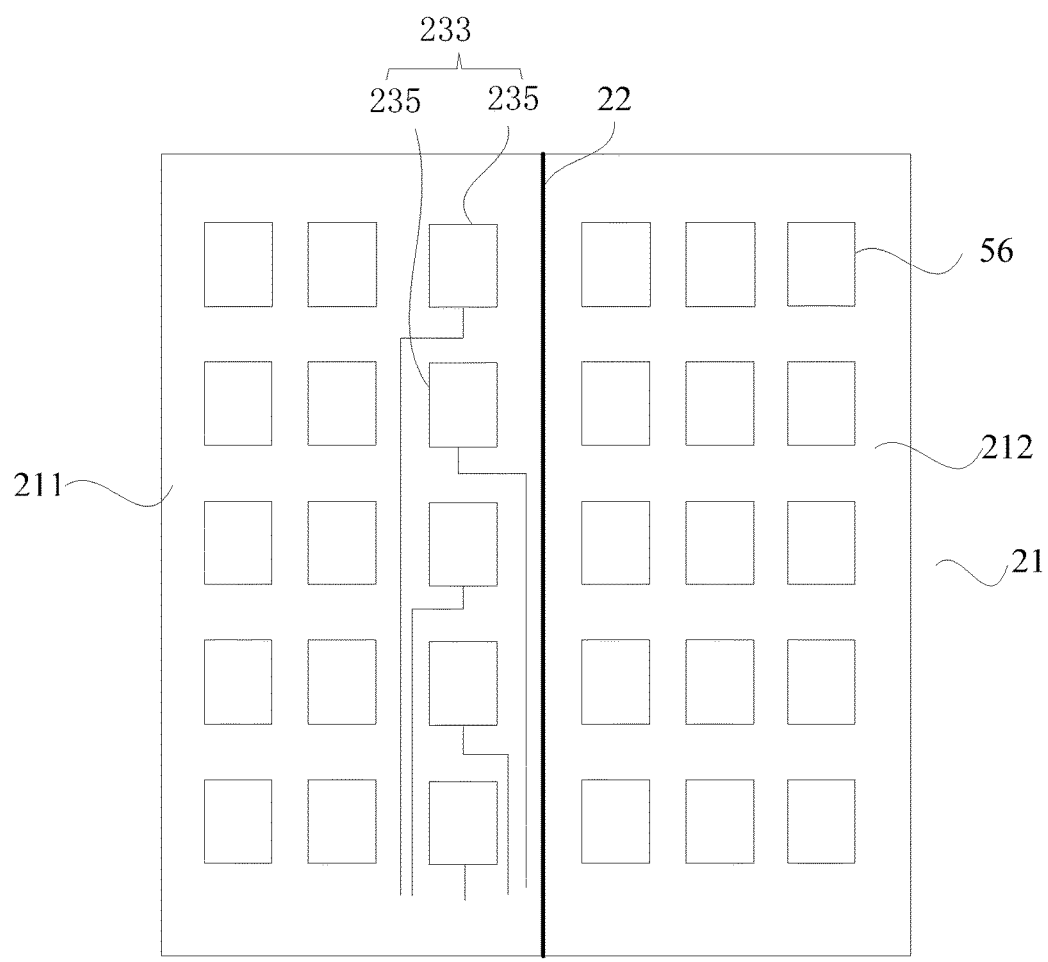
FIG. 5C is a structural representation of a further folding display device according to one embodiment.

Further, in some embodiments, the plurality of touch electrodes 24 may be self-capacitive touch electrodes or mutual-capacitive touch electrodes. When the plurality of touch electrodes 24 are self-capacitive touch electrodes, the control chip sends a touch driving signal to the self-capacitive touch electrodes and obtains a touch detection signal, and it may obtain a touch operation according to the touch detection signal;. When the plurality of touch electrodes 24 are mutual-capacitive touch electrodes, the control chip sends a touch driving signal to a touch driving electrode therein and obtains a touch detection signal from a touch receiving electrode, and it may obtain a touch operation according to touch detection signal. When both the first display portion and the second display portion are provided with the above touch electrodes 24, the control chip may obtain a touch operation of a user on the first display portion 211 and the second display portion 212 via the above touch electrodes 24. Additionally, because in one embodiment, the folding state detecting electrode 23 and the touch electrodes 24 are provided separately, the control chip 25 may control the folding state detecting electrode 23 to detect the degree of folding and at the same time control the touch electrodes 24 to detect a touch operation. FIG. 5A is a structural representation of a further folding display device according to one embodiment, FIG. 5B is a structural representation of a further folding display device according to one embodiment, and FIG. 5C is a structural representation of a further folding display device according to one embodiment. In the folding display device according to one embodiment, the above folding state detecting electrode may be multiplexed as the touch electrodes. Further, the above folding state detecting electrodes may be self-capacitive detecting electrodes or mutual-capacitive touch electrodes.

For example, as shown in FIG. 5A, the folding state detecting electrode and the touch electrode that is not multiplexed are both mutual-capacitive touch electrodes. The folding state detecting electrode includes a first folding state detecting electrode 231 and a second folding state detecting electrode 232. The touch electrode that is not multiplexed includes: a first touch electrodes 54, of which the extension direction is the same as that of the folding state detecting electrode; and a second touch electrode 55, which is configured to intersect with the first touch electrode and the folding state detecting electrode. In working, it may be divided into a touch detecting time period and a folding state detecting time period. During the touch detecting time period, the folding state detecting electrode and the first touch electrode 54 may be selected as the touch driving electrode, and the second touch electrode 55 may be selected as the touch receiving electrode. Alternatively, the second touch electrode 55 may be selected as the touch driving electrode, and the folding state detecting electrode and the first touch electrode 54 may be selected as the touch receiving electrode, and the touched position may be detected by sending the touch driving signal to the touch driving electrode and obtaining the corresponding touch detection signal from the touch receiving electrode. During the folding state detecting time period, as is the same as the case shown in FIG. 2A in which the first folding state detecting electrode 231 and the second folding state detecting electrode 232 in the display device are mutual-capacitive detecting electrodes, the first folding state detecting electrode 231 may be selected as the driving electrode, and the second folding state detecting electrode 232 may be selected as the receiver electrode, or alternatively, the second folding state detecting electrode 232 may be selected as a driving electrode, and the first folding state detecting electrode 231 may be selected as a receiver electrode. Reference may be made to the embodiment shown in FIG. 2A for the specific work principle, and it will not be described again here.

Alternatively for example, as shown in FIG. 5B, when the folding state detecting electrode is a self-capacitive detecting electrode, the folding state detecting electrode refers to the folding state detecting electrode 233 provided on the first display portion 211 and/or the second display portion 212. The touch electrode that is not multiplexed may be a mutual-capacitive touch electrode, and the touch electrode that is not multiplexed includes: a first touch electrode 54, of which the extension direction is the same as that of the folding state detecting electrode 233. A second touch electrode 55, which is configured to intersect with the first touch electrode 54. In working, it may be divided into a touch detecting time period and a folding state detecting time period. During the touch detecting time period, the first touch electrode 54 may be selected as the touch driving electrode, and the second touch electrode 55 may be selected as the touch receiving electrode. Alternatively, the second touch electrode 55 may be selected as the touch driving electrode, and the first touch electrode 54 may be selected as the touch receiving electrode, and the touched position may be detected by sending a touch driving signal to the touch driving electrode and obtaining the corresponding touch detection signal from the touch receiving electrode. At the same time, the touched position may be detected by sending a touch driving signal to the third folding state detecting electrode 233 and obtaining the corresponding touch detection signal from the third folding state detecting electrode 233. During the folding state detecting time period, a driving signal may be sent to the third folding state detecting electrode 233, and the degree of folding of the folding display device may be calculated according to a detection signal obtained from the third folding state detecting electrode 233.

Alternatively, for example, as shown in FIG. 5C, the folding state detecting electrode and the touch electrode that is not multiplexed may both be self-capacitive touch electrodes. The folding state detecting electrode refers to the folding state detecting electrode 233 provided on the first display portion 211 and/or the second display portion 212, and the third folding state detecting electrode 233 includes a plurality of second folding state detecting subelectrodes 235, which are not electrically connected. In working, it may be divided into a touch detecting time period and a folding state detecting time period. During the touch detecting time period, the touched position may be detected by sending a touch driving signal to the third folding state detecting electrode 233 and the touch electrode 56 that is not multiplexed and obtaining the corresponding touch detection signal from the third folding state detecting electrode 233 and the touch electrode 56 that is not multiplexed; during the folding state detecting time period, a driving signal may be sent to the third folding state detecting electrode 233, and the degree of folding of the folding display device may be calculated according to a detection signal obtained from the third folding state detecting electrode 233.

Figure 6A:
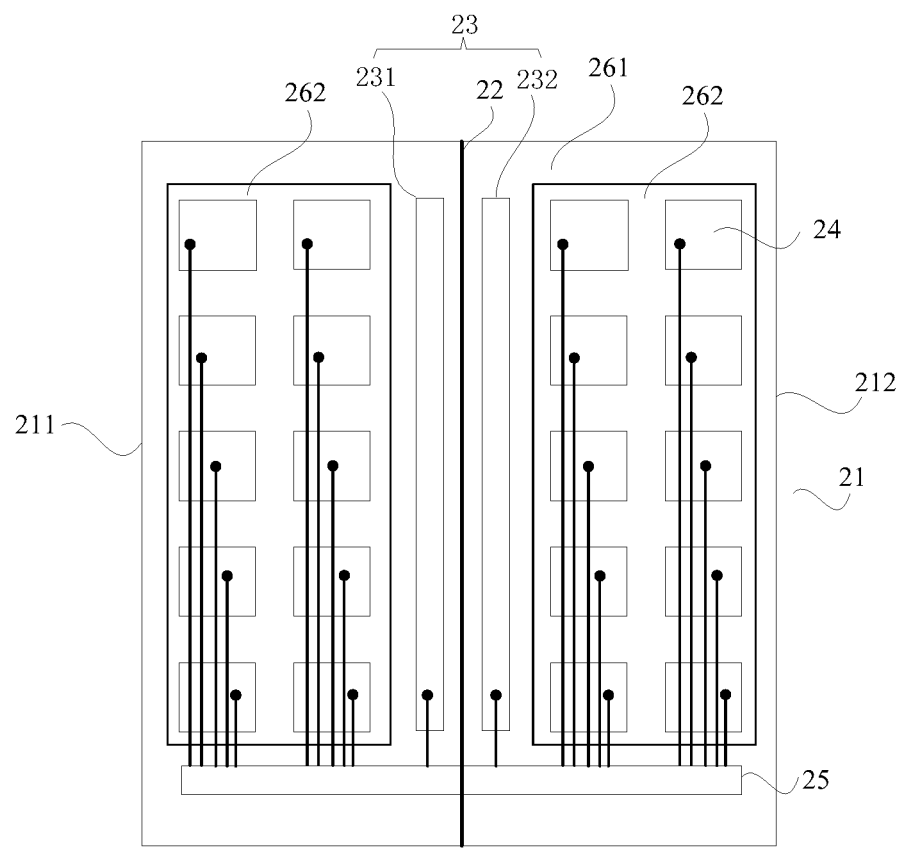
FIG. 6A is a structural representation of another folding display device according to one embodiment.
Figure 6B:
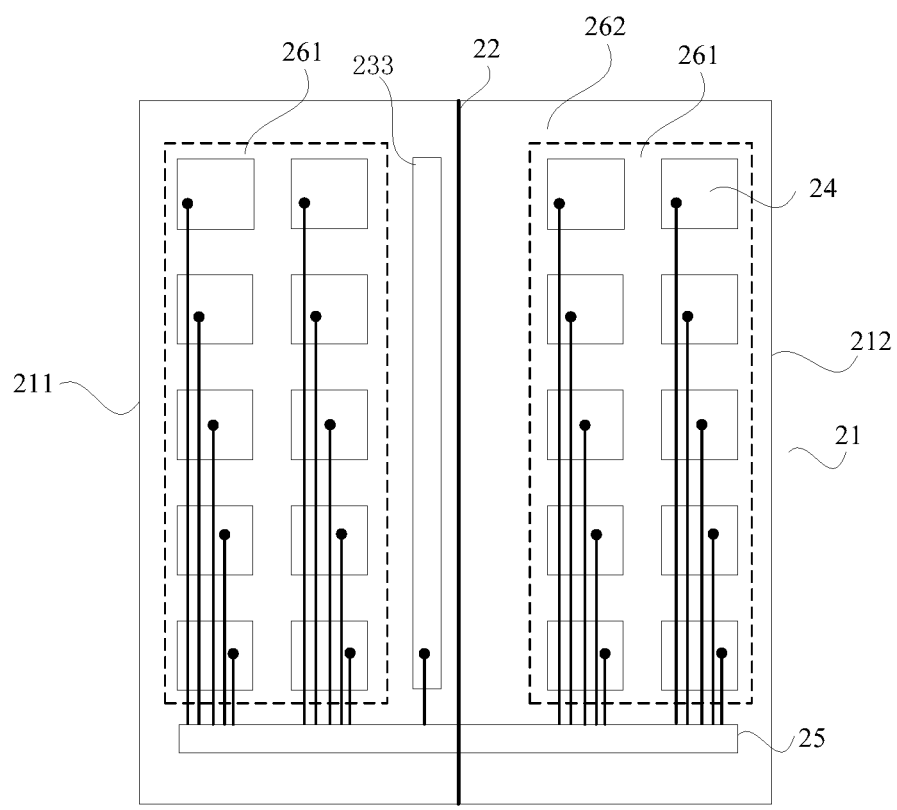
FIG. 6B is a structural representation of another folding display device according to one embodiment.

FIG. 6A is a structural representation of another folding display device according to one embodiment, and FIG. 6B is a structural representation of another folding display device according to one embodiment. In the folding display device according to one embodiment, the first display portion 211 and the second display portion 212 may include a non-display region 261 and a display region 262, wherein the folding state detecting electrode 23, for example, the first folding state detecting electrode 231 and the second folding state detecting electrode 232 shown in FIG. 6A and the third folding state detecting electrode 231 shown in FIG. 6B, is located in the non-display region 261, and also the above touch electrodes 24 and other display elements may be provided in the display region 262. Here, the above touch electrodes 24 may be provided in the display region uniformly, thereby improving the touch detection effect.

Figure 7:
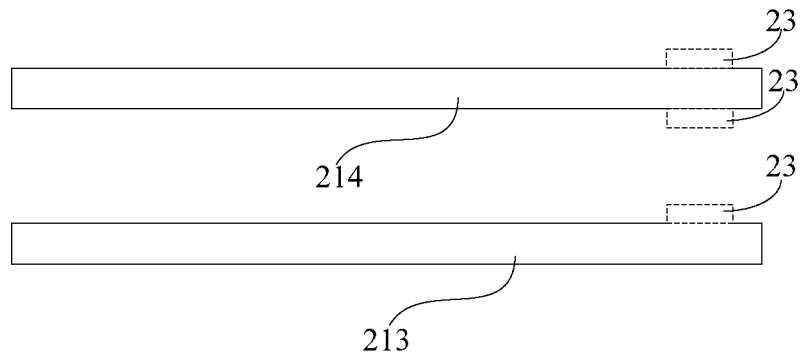
FIG. 7 is a schematic sectional view of a display panel in a folding display device according to one embodiment.

Further, FIG. 7 is a schematic sectional view of a display panel in a folding display device according to one embodiment. As shown in FIG. 7, the display panel 21 therein may include an array substrate 213 and an opposite substrate 214 that is provided opposite to the array substrate 213, and the folding state detecting electrode 23 may be provided on a side of the array substrate 213 that faces the opposite substrate 214, a side of the opposite substrate 214 that faces the array substrate 213, or a side of the opposite substrate 214 that is away from the array substrate 213.

Figure 8A:
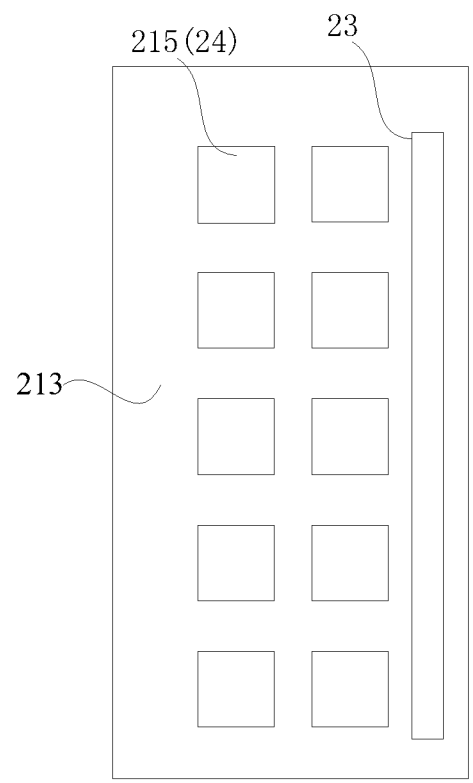
FIG. 8A is a structural representation of an array substrate in a folding display device according to one embodiment.

Specifically, in the case that the display panel 21 is a liquid crystal display panel, the opposite substrate 214 may be a color filter substrate; moreover, in the case that the display panel 21 is a liquid crystal display panel, FIG. 8A shows schematic sectional view of an array substrate in a folding display device according to one embodiment. As shown in FIG. 8A, an array substrate 213 is provided with a common electrode layer, which include a plurality of common subelectrodes 215, wherein the plurality of common subelectrodes 215 may be multiplexed as the touch electrodes 24, and further, the folding state detecting electrode 23 is also provided on the same layer as the common electrode layer. Moreover, optionally, it is also possible that the folding state detecting electrode 23 and a part of the common subelectrodes 215 are multiplexed. During working, in a display time period, the common subelectrodes are used for displaying, and in the touch detecting time period, a part of the common subelectrodes are multiplexed as the touch electrodes 24 and hence may be used for detecting a touch operation, and a part of the common subelectrodes are multiplexed as the folding state detecting electrode 23 and hence may be used for detecting the folding state. In such a configuration, not only the thickness of the display panel 21 is decreased, but also the processing steps are simplified.

Figure 8B:
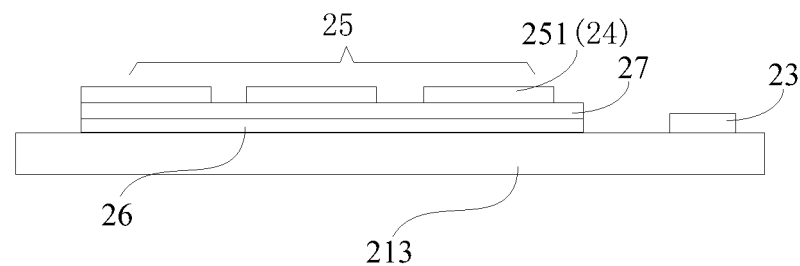
FIG. 8B is schematic sectional view of an array substrate in a folding display device according to one embodiment.

Additionally, the above display panel may also be an organic light-emitting diode (OLED) display panel, and in this case, the opposite substrate is a cover plate. FIG. 8B is a structural representation of an array substrate in a folding display device according to one embodiment. As shown in FIG. 8B, when the display panel is an organic light-emitting display panel, the above array substrate 213 may include: a cathode layer 25, an anode layer 26, and an organic light-emitting layer 27 between the cathode layer 25 and the anode layer 26; the cathode layer 25 includes a plurality of cathode blocks 251, which are multiplexed as the touch electrodes 24; and the folding state detecting electrode 23 is also provided in the same layer as cathode layer 25, that is, they may be made of the same material in one and the same process, and hence the manufacturing process can be effectively simplified.

Figure 8C:
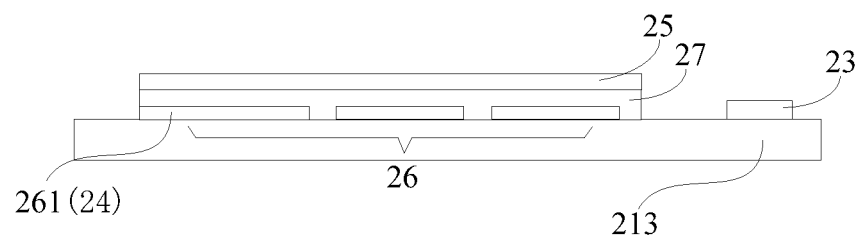
FIG. 8C is schematic sectional view of an array substrate in a folding display device according to one embodiment.

Alternatively, FIG. 8C is a structural representation 3 of an array substrate in a folding display device according to one embodiment. As shown in FIG. 8C, the anode layer 26 includes a plurality of anode blocks 261, which are multiplexed as the touch electrodes 24; at this time, the folding state detecting electrode 23 is also set on the same layer as the anode layer 26, that is, they may be made of the same material in one and the same process, and hence the manufacturing process can be effectively simplified.

It should be noted that the above description only shows some preferred embodiments of the disclosure and the technical principles employed. It will be understood by one skilled in the art that the disclosure is not limited to the specific embodiments described herein and various apparent variations, readjustments and substitutions can be made. Therefore, although the disclosure has been illustrated in detail by the above embodiments, the disclosure will not be limited to the above embodiments, and other equivalent embodiments may also be included without departing from the conception of the disclosure. Therefore, the scope of the disclosure will be defined by the scope of the appended claims.

The invention claimed is:

1. A folding display device, comprising:
a folding shaft
a display panel configured to be folded along the folding shaft;
wherein, the folding shaft is configured to partition the display panel into a first display portion and a second display portion, wherein
a folding state detecting electrode is provided on the first display portion and/or the second display portion, and the folding state detecting electrode is a capacitive detecting electrode,
wherein a first folding state detecting electrode is provided on a side of the first display portion that is close to the folding shaft, and a second folding state detecting electrode is provided on a side of the second display portion that is close to the folding shaft, and the first folding state detecting electrode and the second folding state detecting electrode are mutual-capacitive detecting electrodes,
wherein at least one of the first folding state detecting electrode and the second folding state detecting electrode comprises a plurality of first folding state detecting subelectrodes electrically independent.

2. The display device according to claim 1, wherein, the first folding state detecting subelectrode comprises a plurality of electrode detecting subunits that are electrically connected.

3. The display device according to 1, wherein, the display panel is further provided with a plurality of touch electrodes, and the folding state detecting electrode is provided in the same layer as the touch electrodes.

4. The display device according to claim 3, wherein, the plurality of touch electrodes are self-capacitive detecting electrodes or mutual-capacitive touch electrodes.

5. The display device according to claim 4, wherein, the folding state detecting electrode is multiplexed as the touch electrode.

6. The display device according to claim 3, wherein, the first display portion and the second display portion comprise a display region and a non-display region, wherein the folding state detecting electrode is located in the non-display region.

7. The display device according to claim 6, wherein, the display panel comprises an array substrate and an opposite substrate that is provided opposite to the array substrate, the folding state detecting electrode is provided on a side of the array substrate that faces the opposite substrate or a side of the opposite substrate that faces the array substrate or a side of the opposite substrate that is away from the array substrate.

8. The display device according to claim 7, wherein, the display panel is a liquid crystal display panel;

the array substrate is provided with a common electrode layer, which comprises a plurality of common subelectrodes, wherein the plurality of common subelectrodes are multiplexed as the touch electrode.

9. The display device according to claim 7, wherein,
the display panel is an organic light-emitting display panel;
the array substrate comprises: a cathode layer, an anode layer, and an organic light-emitting layer between the cathode layer and the anode layer;
the cathode layer comprises a plurality of cathode blocks, which are multiplexed as the touch electrode; and
the anode layer comprises a plurality of anode blocks, which are multiplexed as the touch electrode.

10. A folding display device, comprising:
a folding shaft;
a display panel configured to be folded along the folding shaft;
wherein, the folding shaft is configured to partition the display panel into a first display portion and a second display portion, wherein
a folding state detecting electrode is provided on the first display portion and/or the second display portion, and the folding state detecting electrode is a capacitive detecting electrode,
wherein at least one of the first display portion and the second display portion is provided with a third folding state detecting electrode, which is a self-capacitive detecting electrode.

11. The display device according to claim 10, wherein, the third folding state detecting electrode is a strip electrode, and the extension direction of the strip electrode is the same as the extension direction of the folding shaft; or
the third folding state detecting electrode is a curviform electrode; and
the third folding state detecting electrode comprises a plurality of electrode detecting units that are electrically connected to each other.

12. The display device according to claim 10, wherein, the third folding state detecting electrode comprises a plurality of second folding state detecting subelectrodes.

13. The display device according to claim 12, wherein, the second folding state detecting subelectrode comprises a plurality of electrode detecting subunits that are electrically connected to each other.

14. The display device according to claim 10, wherein, the electrode detecting unit has a shape of any one of a rectangle, a curviform, a diamond, a triangle and a circle.

15. The display device according to 10, wherein, the display panel is further provided with a plurality of touch electrodes, and the folding state detecting electrode is provided in the same layer as the touch electrodes.

16. The display device according to claim 15, wherein, the plurality of touch electrodes are self-capacitive detecting electrodes or mutual-capacitive touch electrodes.

17. The display device according to claim 16, wherein, the folding state detecting electrode is multiplexed as the touch electrode.

18. The display device according to claim 15, wherein, the first display portion and the second display portion comprise a display region and a non-display region, wherein the folding state detecting electrode is located in the non-display region.

19. The display device according to claim 18, wherein, the display panel comprises an array substrate and an opposite substrate that is provided opposite to the array substrate, the folding state detecting electrode is provided on a side of the array substrate that faces the opposite substrate or a side of the opposite substrate that faces the array substrate or a side of the opposite substrate that is away from the array substrate.

20. The display device according to claim 19, wherein,
the display panel is an organic light-emitting display panel;
the array substrate comprises: a cathode layer, an anode layer, and an organic light-emitting layer between the cathode layer and the anode layer;
the cathode layer comprises a plurality of cathode blocks, which are multiplexed as the touch electrode; and
the anode layer comprises a plurality of anode blocks, which are multiplexed as the touch electrode.

* * * * *